(12) United States Patent
Schmider

(10) Patent No.: US 7,891,687 B2
(45) Date of Patent: *Feb. 22, 2011

(54) METHOD TO CONCEAL BICYCLE CONTROL CABLES WITHIN THE HANDLEBARS, STEM AND FRAME

(75) Inventor: John Schmider, Thornhill (CA)

(73) Assignee: Magna Marque International Inc., Aurora (CA)

( * ) Notice: Subject to any disclaimer, the term of this patent is extended or adjusted under 35 U.S.C. 154(b) by 458 days.

This patent is subject to a terminal disclaimer.

(21) Appl. No.: 11/299,423

(22) Filed: Dec. 12, 2005

(65) Prior Publication Data

US 2006/0145446 A1 Jul. 6, 2006

Related U.S. Application Data

(60) Provisional application No. 60/634,846, filed on Dec. 10, 2004.

(51) Int. Cl.
*B62K 21/02* (2006.01)
(52) U.S. Cl. .................................. 280/281.1; 74/551.1
(58) Field of Classification Search .............. 280/281.1, 280/279; 74/551.1
See application file for complete search history.

(56) References Cited

U.S. PATENT DOCUMENTS

| 4,585,246 | A | 4/1986 | Diekman et al. |
| 4,768,798 | A | 9/1988 | Reed et al. |
| 4,917,397 | A | 4/1990 | Chonan |
| 4,930,798 | A * | 6/1990 | Yamazaki et al. ............ 280/261 |
| 4,974,864 | A | 12/1990 | Giocastro |
| 5,478,100 | A | 12/1995 | McDermitt, Jr. et al. |
| 7,000,936 | B2 * | 2/2006 | Schmider .................. 280/281.1 |
| 7,240,772 | B2 * | 7/2007 | Tsai ......................... 188/24.22 |
| 2005/0029772 | A1 * | 2/2005 | Oi ............................ 280/281.1 |

FOREIGN PATENT DOCUMENTS

| EP | 0001646 A1 * | 10/1978 |
| JP | 2005329938 A * | 12/2005 |

* cited by examiner

*Primary Examiner*—Kevin Hurley
(74) *Attorney, Agent, or Firm*—Clark Hill PLC

(57) ABSTRACT

A bicycle is provided including a tubular frame having interconnected tubes defining hollow passageways. A curvilinear hollow handlebar is operatively coupled to the frame. The handlebar includes at least one aperture and an opening providing access to the passageways in the frame. A control lever is operatively mounted to the handlebar for controlling a component of the bicycle. A control cable has a first end fixedly secured to the control lever and a second end adapted to be secured to the component of the bicycle for actuation thereof. The control cable extends through the aperture into the handlebar and through the opening of the handlebar into the passageways of the frame between the first and second ends to conceal the control cable within the frame and the handlebar.

12 Claims, 9 Drawing Sheets

Sectional View of handlebar & fork assembly

Figure 1—Side View of bicycle, featuring preferred embodiment of invention
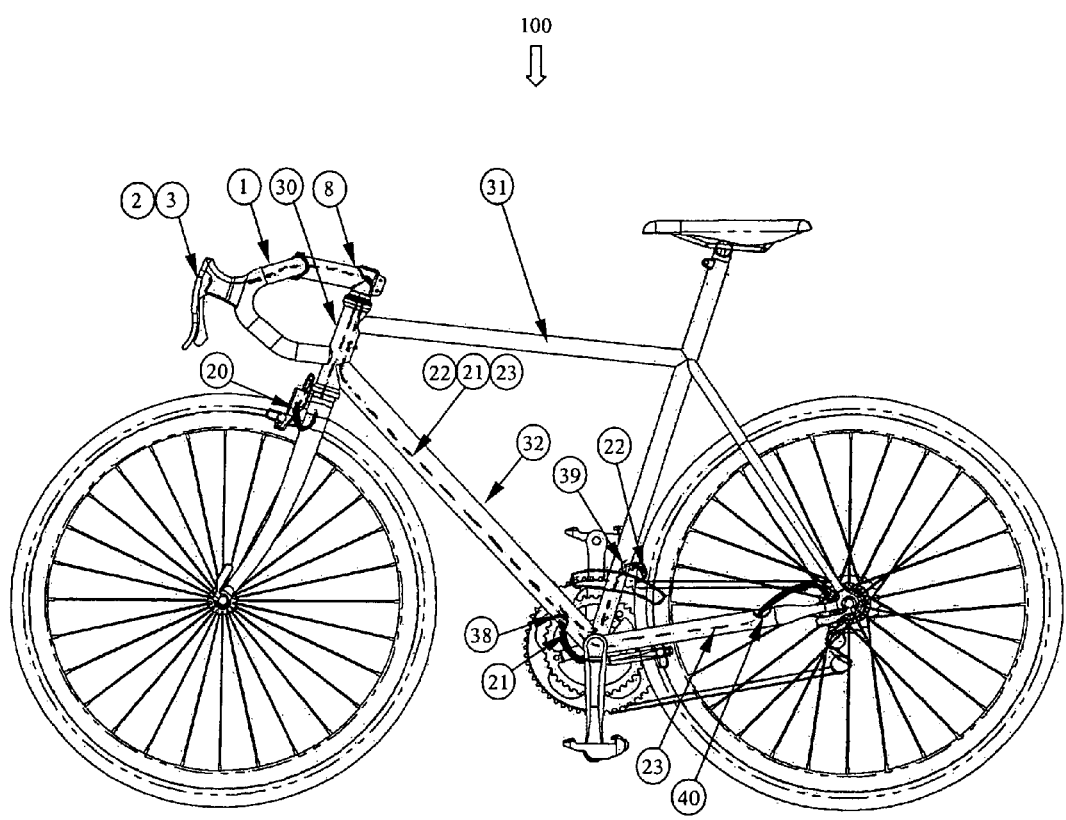

Figure 2 – Isometric View of handlebar & fork assembly
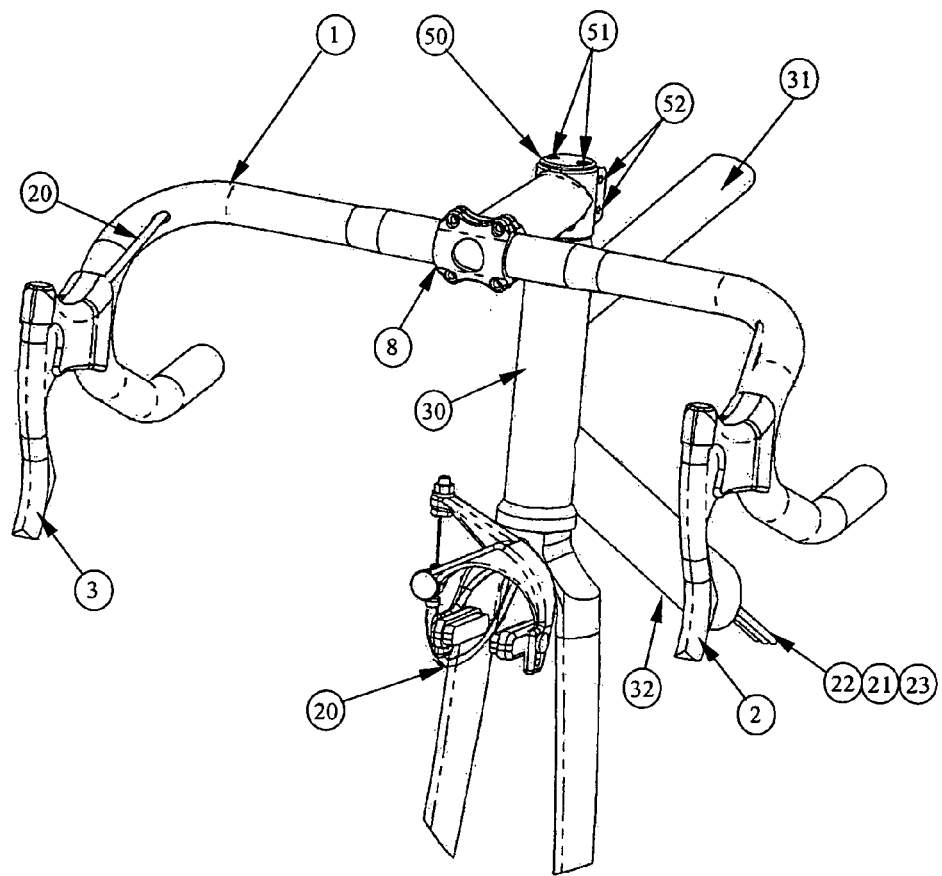

Figure 3—Side View of handlebar & fork assembly
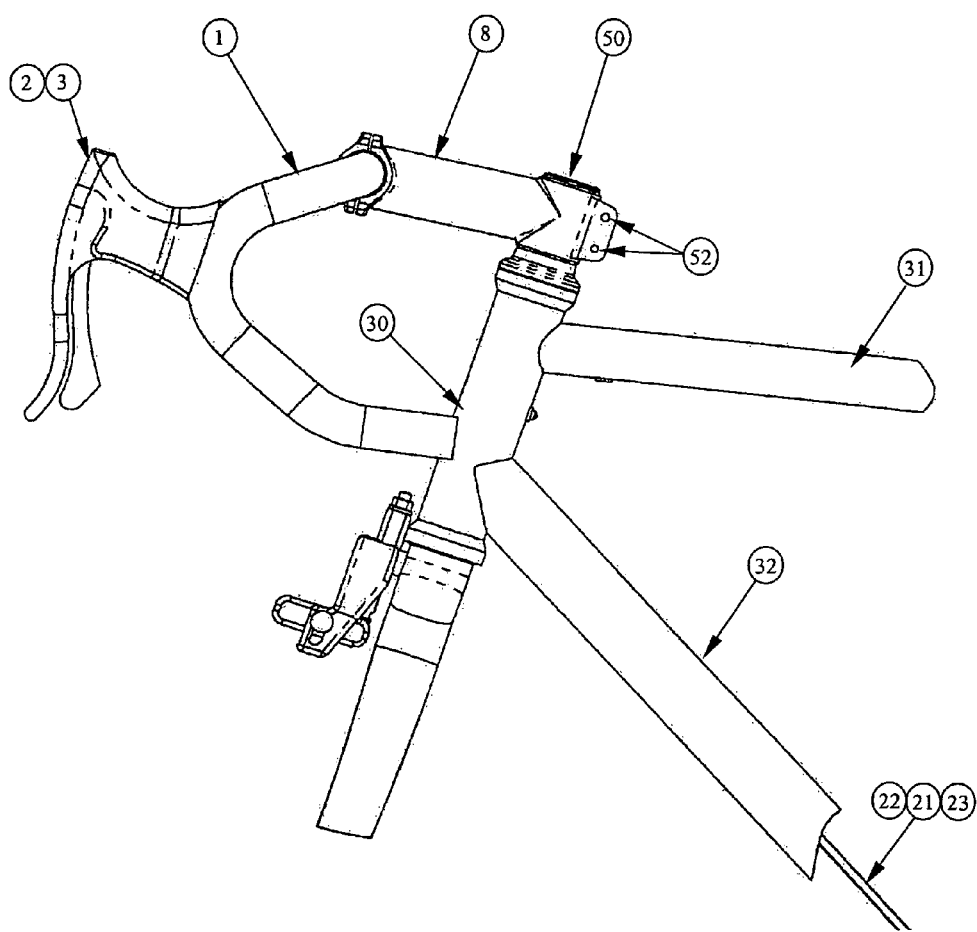

Figure 4—Front View of handlebar & fork assembly
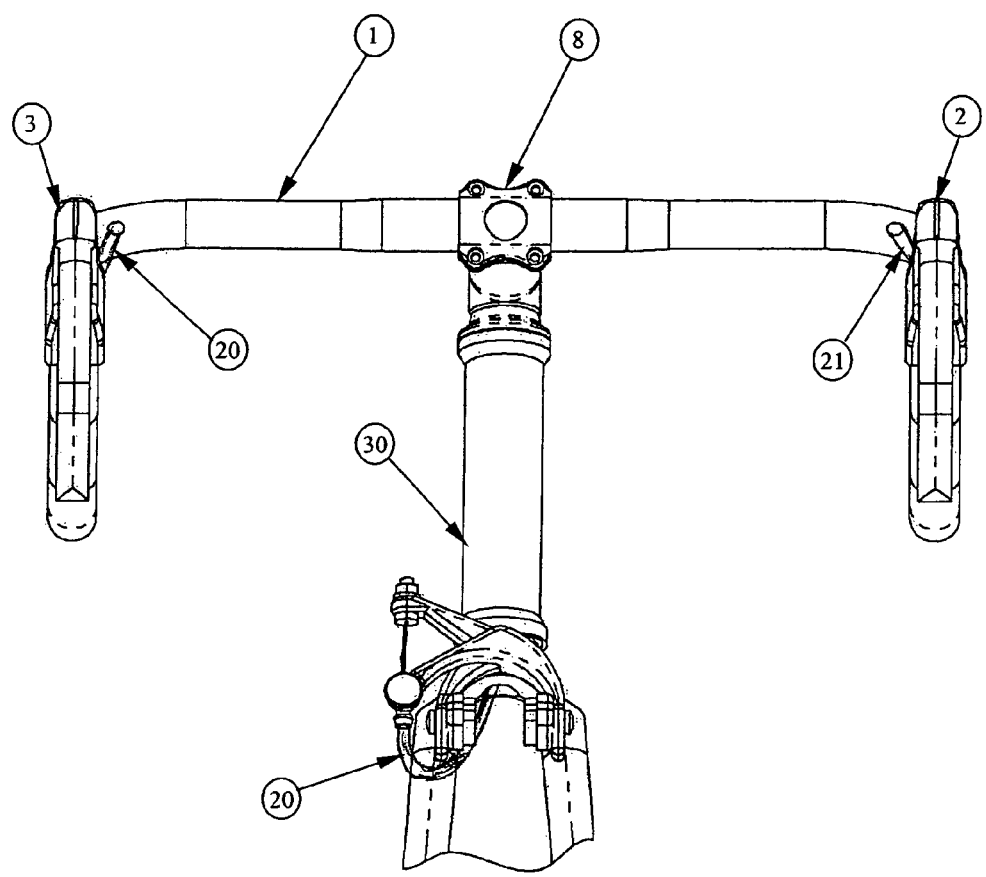

Figure 5—Isometric View of fork assembly
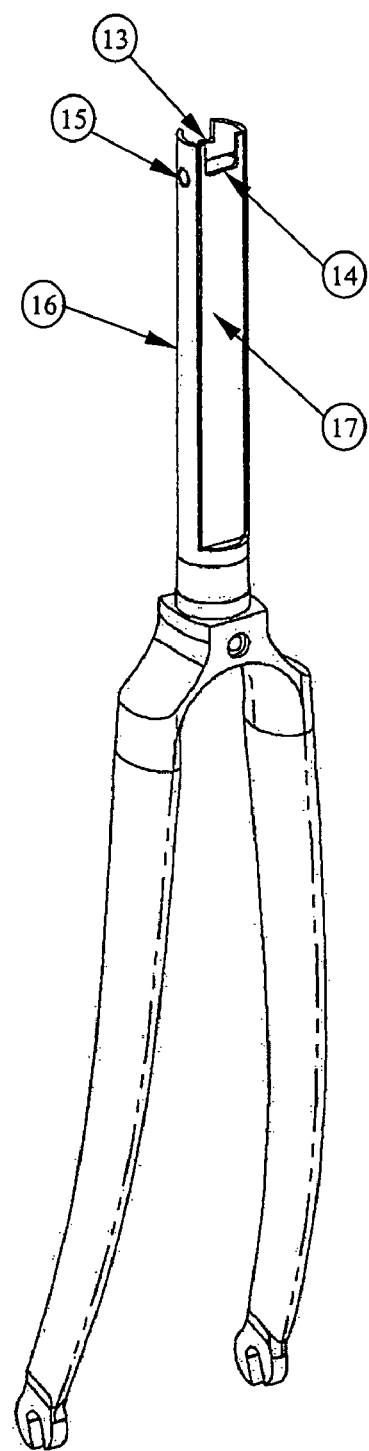

Figure 6—Isometric View of handlebar & cables
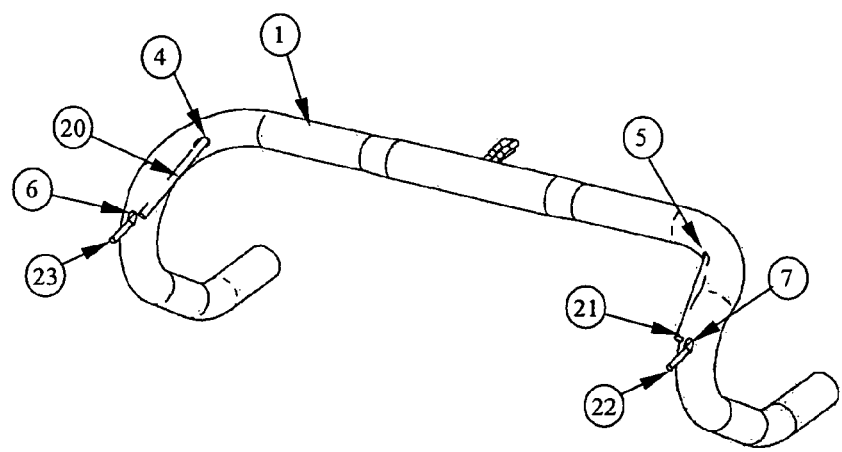
Figure 7—Isometric View of handlebar & cables
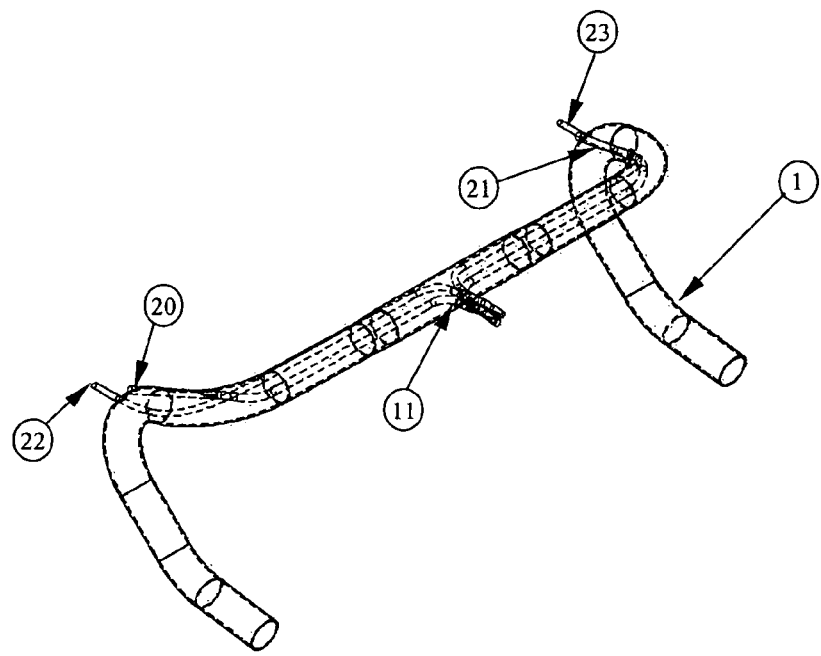

Figure 8—Sectional View of handlebar & fork assembly
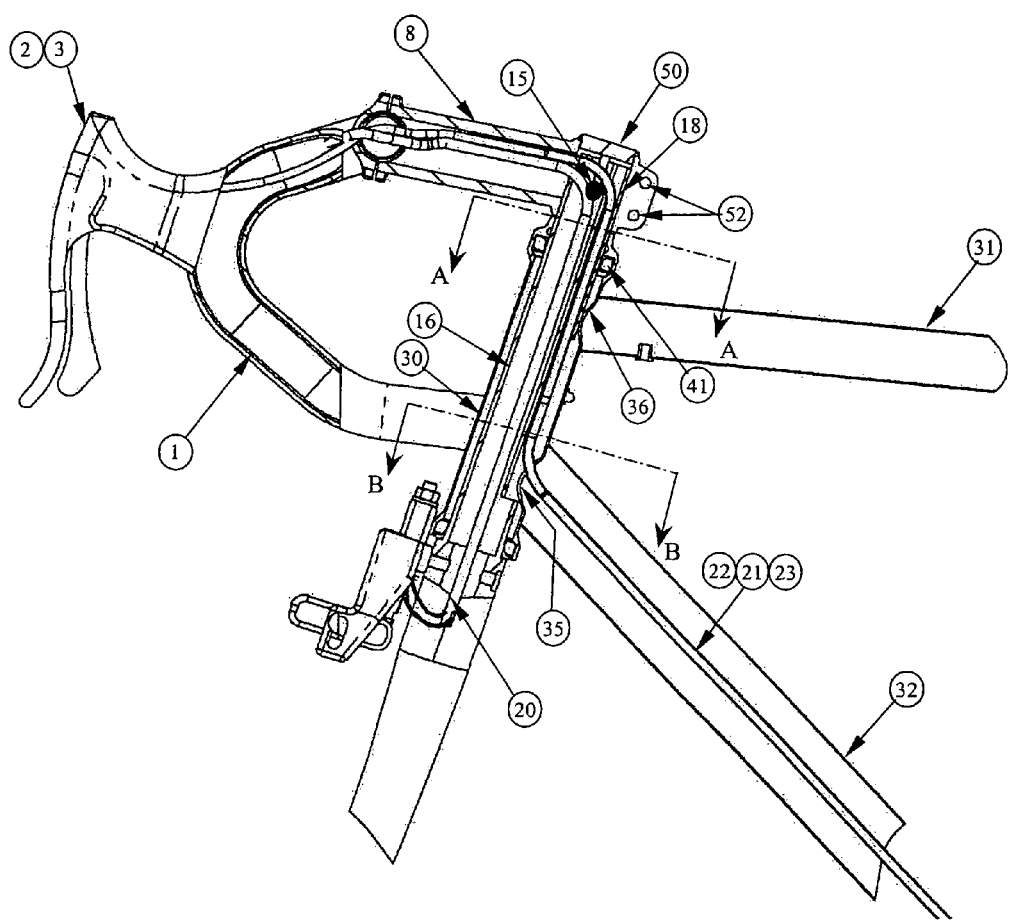

Figure 9—Sectional View of fork assembly, using sectional position A-A from Figure 8, with fork in 'straight ahead' position

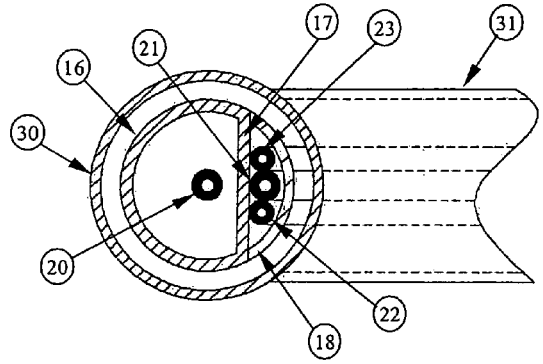

Figure 10—Sectional View of fork assembly, using sectional position B-B from Figure 8, with fork in 'straight ahead' position

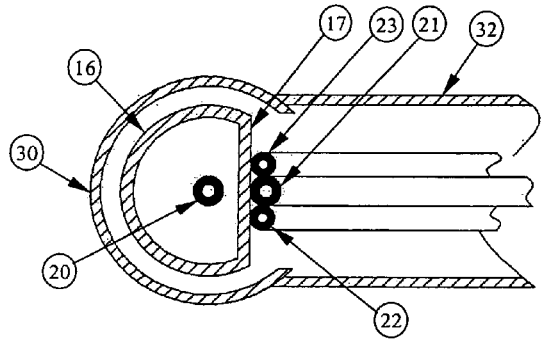

Figure 11—Sectional View of fork assembly, using sectional position B-B from Figure 8, with fork rotated away from 'straight ahead' position

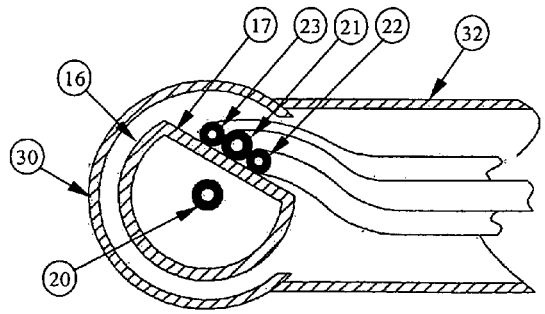

METHOD TO CONCEAL BICYCLE CONTROL CABLES WITHIN THE HANDLEBARS, STEM AND FRAME

CROSS-REFERENCE TO RELATED APPLICATION

This application claims priority to and all the benefits of U.S. Provisional Application Ser. No. 60/634,846, filed on Dec. 10, 2004 and entitled "Method To Conceal Bicycle Control Cables Within The Handlebars, Stem And Frame."

BACKGROUND OF THE INVENTION

1. Field of the Invention

The invention relates to a bicycle and, more particularly, to a bicycle and method of concealing control cables within the handlebars, stem and frame of the bicycle.

2. Description of the Related Art

Bicycles include control cables, which are used to control front and rear wheel braking systems and front and rear shifting mechanisms, such as front and rear derailleurs. Typically, the control cables are routed from brake and shift levers to the braking systems and derailleurs, using one of two possible methods or a combination thereof.

In a first method, the control cables exit the brake and/or shift levers mounted to a handlebar and are routed along the handlebar. The portion of the control cables routed along the handlebar is concealed underneath padding of the handlebar. At a point, slightly ahead of the point where the handlebar is affixed to a stem, the control cables are exposed and routed directly to attachment points on the frame of the bicycle. Typically, clips, bosses or other means are used to affix the control cables to the frame. A generally large loop of control cable runs between the handlebar and frame, to allow for turning of the handlebar.

In a second method, similar to the first, the control cables exit the brake and/or shift levers and are routed directly to the cable attachment points on the frame. In this methodology, there is no attempt made to conceal the control cables along the handlebar.

In either method, the exposed portion of the control cables detracts from the overall aesthetics of the bicycle, as well as potentially obscuring any artwork or graphics applied to the bicycle. Additionally, the exposed cable segments are susceptible to snagging, fouling and corrosion, while adversely contributing to the overall aerodynamic drag on the bicycle.

Current bicycle designs do not address the aforementioned problems. Some bicycles do provide for routing of the control cables through the frame, but maintain the exposed segments of cable between the handlebar and the cable attachment points on the frame. Systems incorporating variants of this methodology are detailed in U.S. Pat. Nos. 5,478,100, 4,768, 798, and 4,974,864.

SUMMARY OF THE INVENTION

According to one aspect of the invention, a bicycle is provided including a tubular frame having interconnected tubes defining hollow passageways. A curvilinear hollow handlebar is operatively coupled to the frame. The handlebar includes at least one aperture and an opening providing access to the passageways in the frame. A control lever is operatively mounted to the handlebar for controlling a component of the bicycle. A control cable has a first end fixedly secured to the control lever and a second end adapted to be secured to the component of the bicycle for actuation thereof. The control cable extends through the aperture into the handlebar and through the opening of the handlebar into the passageways of the frame between the first and second ends to conceal the control cable within the frame and the handlebar.

According to another aspect of the invention there is provided, a method of concealing a control cable within a handlebar, stem, fork and frame of a bicycle, the method comprising the step of routing the cable into the handlebar and through the handlebar, stem, fork and frame, to conceal the cable within an envelope of the primary structural components of the bicycle.

BRIEF DESCRIPTION OF THE DRAWINGS

Advantages of the present invention will be readily appreciated as the same becomes better understood by reference to the following detailed description when considered in connection with the accompanying drawings wherein:

FIG. 1 is a side view of a bicycle according to the preferred embodiment of the invention;

FIG. 2 is an opposing side view of the bicycle;

FIG. 3 is a perspective view of a handlebar and fork assembly of the bicycle of FIG. 1;

FIG. 4 is a side view of the handlebar and fork assembly;

FIG. 5 is a front view of the handlebar and fork assembly;

FIG. 6 is a perspective view of the fork assembly;

FIG. 7 is a perspective view of the handlebar and control cables;

FIG. 8 is a perspective view of the handlebar with the control cables in phantom;

FIG. 9 is a cross-sectional side view of the handlebar and fork assembly of FIG. 4;

FIG. 10 is a cross-sectional view taken along lines 10-10 of FIG. 9, with the fork in a straight ahead position;

FIG. 11 is a cross-sectional view taken along lines 11-11 of FIG. 9, with the fork in the straight ahead position.

DETAILED DESCRIPTION OF THE PREFERRED EMBODIMENT

Figure 12:
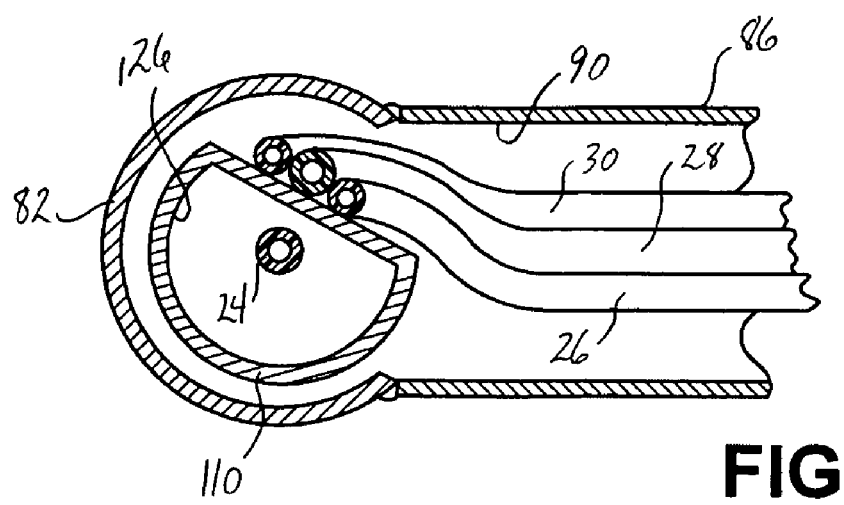
FIG. 12 is a cross-sectional view taken along lines 11-11 of FIG. 10, with the fork rotated away from the straight ahead position.

Referring to FIGS. 1 and 2, the preferred embodiment of the invention includes a bicycle, generally shown at 10, having a curvilinear handlebar 12 operatively coupled to a tubular frame, generally indicated at 14. Referring to FIGS. 3 and 7, the handlebar 12 includes apertures 16, 18, 20, 22 for receiving control cables 24, 26, 28, 30 originating at control levers 32, 34 that are operatively mounted to the handlebar 12. The apertures 16, 18, 20, 22 allow the control cables 24, 26, 28, 30 to be routed from the control levers 32, 34 directly into the handlebar 12, in such a manner as to substantially conceal them, thus improving the aesthetics of the bicycle 10. Handlebar tape, grips or a cover could additionally be incorporated, to further conceal the control cables 24, 26, 28, 30. The control cables may be for example a push-pull Bowden-type cable assembly. The number of apertures, their position and configuration, as well as handlebar style, may be varied without affecting the fundamental spirit or scope of the invention.

Referring to FIGS. 1, 2, 3 and 7, each of the control levers 32, 34 operatively mounted to the handlebar 12 include a brake lever 36, 38 and a shift lever 40, 42. The front brake cable 24 and front derailleur cable 26 extend between first ends 44, 46 fixedly secured to the brake and shift levers 36, 40 and second ends 48, 50 adapted to be secured to a front brake 52 and front derailleur 54, respectively. The front brake and derailleur cables 24, 26 control the front brake 52 and front derailleur 54 when the brake and shift levers 36, 40 are actuated. The rear brake cable 28 and rear derailleur cable 30 extend between first ends 56, 58 fixedly secured to the brake and shift levers 38, 42 and second ends 60, 62 adapted to be secured to a rear brake 64 and rear derailleur 66, respectively. The rear brake and derailleur cables 28, 30 control the rear brake 64 and rear derailleur 66 when the brake and shift levers 38, 42 are actuated. Additional control cables, levers, electric wires or alternate systems and control lever configurations could be included without changing the fundamental spirit or scope of the invention Referring to FIG. 9, a stem 68 for securing the handlebar 12 to the frame 14 of the bicycle 10 includes an axial bore 70 therethrough. The stem 68 extends between a first end 72 fixedly secured to the handlebar 12 and a second end 74 fixedly secured to a fork, generally indicated at 76, rotatably coupled to the frame 14. The control cables 24, 26, 28, 30 exit the handlebar 12 via an opening 78, as shown in FIG. 8, located in the rear of the center section of the handlebar 12. Referring again to FIG. 9, this opening 78 communicates with the axial bore 70 of the stem 68 and allows for unhindered passage of the control cables 24, 26, 28, 30 through the stem 68.

Referring to FIGS. 1, 2, and 9, the tubular frame 14 of the bicycle 10 includes a seat tube 80, head tube 82, top tube 84, down tube 86, and a bottom bracket 88 interconnected to define hollow passageways 90 therethrough. The top tube 84 extends between upper ends 92, 94 of the seat tube 80 and head tube 82. The down tube 86 extends between lower ends 96, 98 of the seat tube 80 and head tube 82. A pair of chain stays 100, 102 extend from the bottom bracket 88 to a rear drop-out 104. A pair of seat stays 106, 108 extend from the upper end 92 of the seat tube 80 to the rear drop-out 104. In the preferred embodiment, connection points between the tubes are welded, but any suitable joining process such as gluing or press-fitting may be used.

Referring to FIGS. 6 and 9, the fork 76 includes a fork steerer tube 110 extending through the head tube 82 of the frame 14. Upper and lower headset bearing assemblies 112, 114 are disposed in the upper and lower ends 94, 98 of the head tube 82. The stem 68 is fixedly secured to the fork steerer tube 110 via a standard pinch bolt clamping arrangement. As shown in FIGS. 9 and 10, a shim 116 is disposed within the head tube 82 adjacent to the fork steerer tube 110 to improve the clamping action between the stem 68 and the fork steerer tube 110. Further, the shim 116 serves to enhance and stiffen the interface between the fork steerer tube 110 and the upper headset bearing assembly 112.

Referring to FIGS. 3 and 9, the stem 68 also includes a stem cap 118 having tension bolts 120 for adjusting the preload of the bearings in the upper and lower headset bearing assemblies 112, 114. Preloading of the bearings is achieved by loosening stem clamping bolts 122, and adjusting the tension bolts 120 of the stem cap 118, which are attached to the fork steerer tube 110 via an integral bar 124. Once the desired level of preload is achieved, the stem clamping bolts 122 are tightened, as required.

Referring to FIGS. 6 and 9, the fork steerer tube 110 of the fork 76 includes an axial bore 126 extending between a top end 128 and a bottom end 130. The control cables 24, 26, 28, 30 enter the top end 128 of the fork steerer tube 110 via a front slot 132, incorporated into the fork steerer tube 110. The front brake cable 24 is routed through the axial bore 126 of the fork steerer tube 110 and exits at the bottom end 130 to be secured to the front brake 52, as shown in FIG. 5.

The rear brake cable 28, and the front and rear derailleur cables 26, 30 exit the fork steerer tube 110 through a rear slot 134 in the fork steerer tube 110. The rear brake, front and rear derailleur cables 28, 26, 30 are then routed along a flat rear face 136 of the fork steerer tube 110, through the upper headset bearing assembly 112, into the head tube 82 of the frame 14. The rear brake, front and rear derailleur cables 28, 26, 30 are then routed into the frame 14 via a passage 138, which communicates between the head tube 82 and the down tube 86. The rear brake cable 28 exits the down tube 86 via an opening 140 to be secured to the rear brake 64, as shown in FIG. 1. The front derailleur cable 26 is routed from the down tube 86 into the seat tube 80 and exits the seat tube 80 via an opening 142 to be secured to the front derailleur 54, as shown in FIG. 2. The rear derailleur cable 30 is routed from the down tube 86 into one of the chain stays 102 and exits the chain stay 102 via an opening 144 to be secured to the rear derailleur 66, as shown in FIG. 2.

This method allows the control cables 24, 26, 28, 30 to pass through the handlebar 12, stem 68, and frame 14 in a manner, which is unhindered and does not hinder the bicycle's steering mechanism, as shown in FIGS. 11 and 12. It should be obvious to one skilled in the art that an additional passage 146 could be placed between the head tube 82 and top tube 84, facilitating alternate control cable routing configurations within the frame 14 of the bicycle 10, without altering the fundamental spirit and scope of the invention.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed is:

1. A bicycle comprising:
   a tubular frame having interconnected tubes defining hollow passageways therethrough;
   a hollow handlebar operatively coupled to said frame, said handlebar having at least one aperture and an opening therein for providing access to said passageways in said frame;
   a control lever operatively mounted to said handlebar for controlling a component of said bicycle; and
   a control cable having a first end fixedly secured to said control lever and a second end adapted to be secured to the component of said bicycle for actuation thereof, said control cable extending through said aperture into said handlebar and through said opening into said passageways in said frame between said first and second ends to conceal said control cable within said frame and said handlebar.

2. A bicycle as set forth in claim 1 including a fork having a fork steerer tube rotatably coupled to said frame.

3. A bicycle as set forth in claim 2 wherein said fork steerer tube includes a front slot, a rear slot, and a flat rear face.

4. A bicycle as set forth in claim 3 including a stem having an axial bore, said stem extending between a first end fixedly secured to said handlebar and a second end fixedly secured to said fork.

5. A bicycle as set forth in claim 4 wherein said tubular frame includes a seat tube, head tube, top tube, down tube, and a pair of chain stays defining passageways in said frame for concealing said control cable and including at least one opening allowing said control cable to exit adjacent the component of said bicycle.

6. A bicycle as set forth in claim 5 wherein said control cable extends through said aperture into said handlebar, through said opening in said handlebar into said stem, through said axial bore in said stem into said fork, and through said fork steerer tube of said fork into said passageways in said frame between said first and second ends to conceal said control cable within said handlebar, stem, fork and frame.

7. A bicycle as set forth in claim 6 including a plurality of control cables.

8. A bicycle as set forth in claim 7 wherein said plurality of control cables include a front brake cable, a front derailleur cable, a rear brake cable, and a rear derailleur cable.

9. A bicycle as set forth in claim 8 wherein said front brake cable extends through said passageways in said handlebar, stem, and fork steerer tube to a front brake.

10. A bicycle as set forth in claim 8 wherein said rear brake cable extends through said passageways in said handlebar, stem, fork steerer tube, head tube and down tube to a rear brake.

11. A bicycle as set forth in claim 8 wherein said front derailleur cable extends through said passageways in said handlebar, stem, fork steerer tube, head tube, down tube and seat tube to a front derailleur.

12. A bicycle as set forth in claim 8 wherein said rear derailleur cable extends through said passageways in said handlebar, stem, fork steerer tube, head tube, down tube and one of said chain stays to a rear derailleur.

* * * * *